United States Patent [19]

Benes et al.

[11] 4,141,566
[45] Feb. 27, 1979

[54] WHEELCHAIR SUPPORTING SLED

[75] Inventors: David M. Benes, 5108 Wildwood, Wixom, Mich. 48096; Allan L. Gates, 408 S. Kinney, Mt. Pleasant, Mich. 48858; Richard Ryan, Stanwood, Mich.

[73] Assignees: David M. Benes, Wixom; Allan L. Gates, Mt. Pleasant, both of Mich.

[21] Appl. No.: 795,704

[22] Filed: May 11, 1977

[51] Int. Cl.² .............................................. B62B 13/04
[52] U.S. Cl. ...................................................... 280/16
[58] Field of Search ................. 280/16, 21 R; 296/65R

[56] References Cited

U.S. PATENT DOCUMENTS

| 3,799,565 | 3/1974 | Burtis et al. | 280/16 |
| 3,905,436 | 9/1975 | Karchak, Jr. et al. | 296/65 R |

FOREIGN PATENT DOCUMENTS

| 217307 | 2/1961 | Austria | 280/21 R |
| 742782 | 3/1933 | France | 280/16 |

*Primary Examiner*—Joseph F. Peters, Jr.
*Assistant Examiner*—Norman L. Stack, Jr.
*Attorney, Agent, or Firm*—Basile and Weintraub

[57] ABSTRACT

A sled frame for the releasable attachment of a wheelchair. The sled frame includes a body portion supporting a pair of laterally spaced, horizontally disposed support members which, in turn, are sized to be disposed between the wheels of a wheelchair to support the frame of the wheelchair on the sled. The support members are each provided with a plurality of locking devices which releasably engage the frame of a wheelchair to securely lock the wheelchair to the sled. The sled frame further includes a pair of laterally spaced, longitudinally disposed ski runners. A steering runner provided at the forward end of the sled is attached to a steering post that extends upwardly through the frame and rearwardly toward the wheelchair support area such that an occupant of the wheelchair may grasp the steering wheel carried at the upper extending end of the steering post to facilitate the steering of the sled. In the preferred embodiment the sled is provided with outriggers extending laterally from each of the ski runners for providing additional stability to the sled and safety to its occupant. The rearward portions of the runners extend rearwardly of the frame a sufficient distance to permit a second occupant to stand on the upper surfaces of the runners for aiding the wheelchair occupant in steering the sled. Other mechanisms are provided for controlling the steering and braking the sled.

4 Claims, 5 Drawing Figures

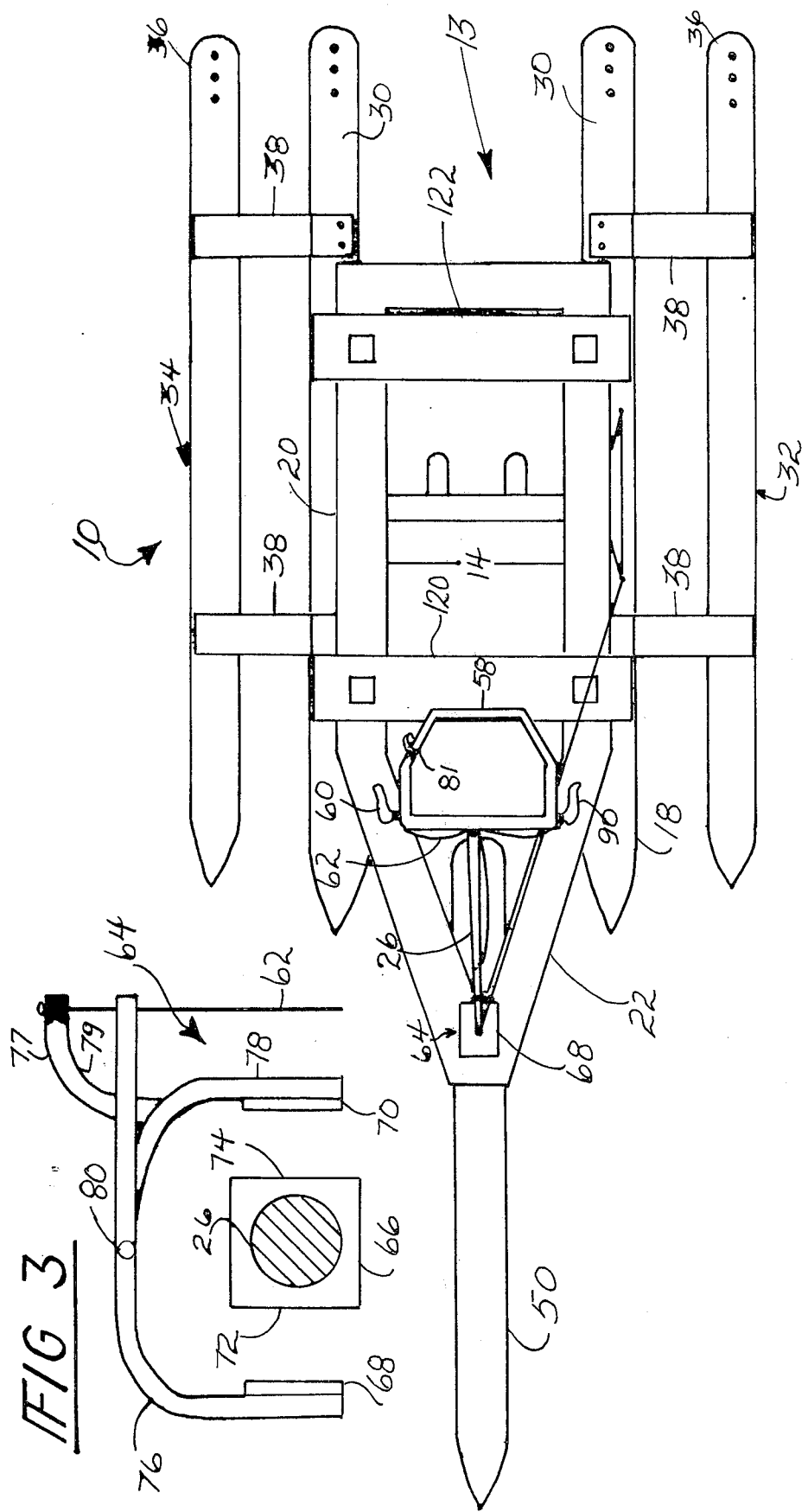

WHEELCHAIR SUPPORTING SLED

BACKGROUND OF THE INVENTION

I. Field of the Invention

The present invention relates to snow sleds and, in particular, to a sled which mounts a wheelchair and has means for permitting the occupant of the wheelchair to steer the sled.

II. Description of the Prior Art

Heretofore, numerous sleds have been devised to safely carry occupants in many conditions. Of particular concern is the situation that exists when children coast on sleds downhill in a controlled manner. Such sled riding is an old sport having been enjoyed for many years. The use of known sleds, such as the type disclosed in U.S. Pat. No. 3,900,208, requires that the occupant have full control and use of his limbs. Persons who are confined to wheelchairs and the like are precluded from using such conventional sleds.

Various schemes have been proposed for modifying wheeled vehicles, such that the same may be adapted for movement through snow and the like by the provision of a runner attachment to the wheels of the sled. Examples of such prior art apparatuses are disclosed in U.S. Pat. Nos. 1,657,534; 2,523,950; and 3,153,543. An inspection of these patents reveals that they relate primarily to simple apparatus that attaches a ski or runner to the wheels of the vehicle to permit the vehicle to be pushed through snow and the like. It is obvious that the simple attachment of a runner of the type disclosed in the aforementioned patents to a wheelchair to permit the wheelchair to travel down a hill results in a dangerous situation, as such a constructed wheelchair would travel downhill in an uncontrolled manner and very likely collide with children or other sleds on the hill. This would result in a high risk and possible serious injuries to both the occupant of the wheelchair and other persons in the path of such a vehicle.

It would therefore be desirable to provide a sled which is adapted to mount a conventional wheelchair and so designed that the occupant of the wheelchair may travel downhill in a controlled fashion, either due to the manipulation of the steering mechanism of the sled by means of the occupant or by means of a second party riding on the sled with the occupant.

SUMMARY OF THE INVENTION

The present invention, which will be described subsequently in greater detail, comprises a sled frame for the releasable attachment of a wheelchair. The sled is provided with space runners fixedly attached to the sled for providing support for the sled and a movable runner attached to a steering post to facilitate the steering of the sled during downhill motion. The steering post is sized to permit the occupant of a wheelchair to steer the sled. Suitable steering wheel locking and braking devices are provided to, respectively, permit the occupant to lock the steering wheel in a desired direction and to stop the sled as desired.

It is therefore a primary object of the present invention to provide a new and improved sled particularly adapted for mounting a wheelchair thereto to permit the occupant of the wheelchair to travel downhill on the sled in a controlled fashion.

It is a further object of the present invention to provide such a wheelchair carrying sled which is simple in its design and construction, yet provides several safety features which enable a wheelchair ridden person to manipulate the sled in a safe and convenient manner, both in traveling downhill on the sled as well as permitting the occupant of a sled to travel to the top of a hill by means of a towrope or the like.

Other objects, advantages and applications of the present invention will become apparent to those skilled in the art of sleds when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a top plan view of the sled illustrated in FIG. 1 of the drawings with the outriggers attached to the sled runners;

FIG. 3 is a fragmentary enlarged view of the steering wheel locking mechanism incorporated in the sled illustrated in FIGS. 1 and 2 of the drawings;

DESCRIPTION OF THE PREFERRED EMBODIMENT

Figure 1:
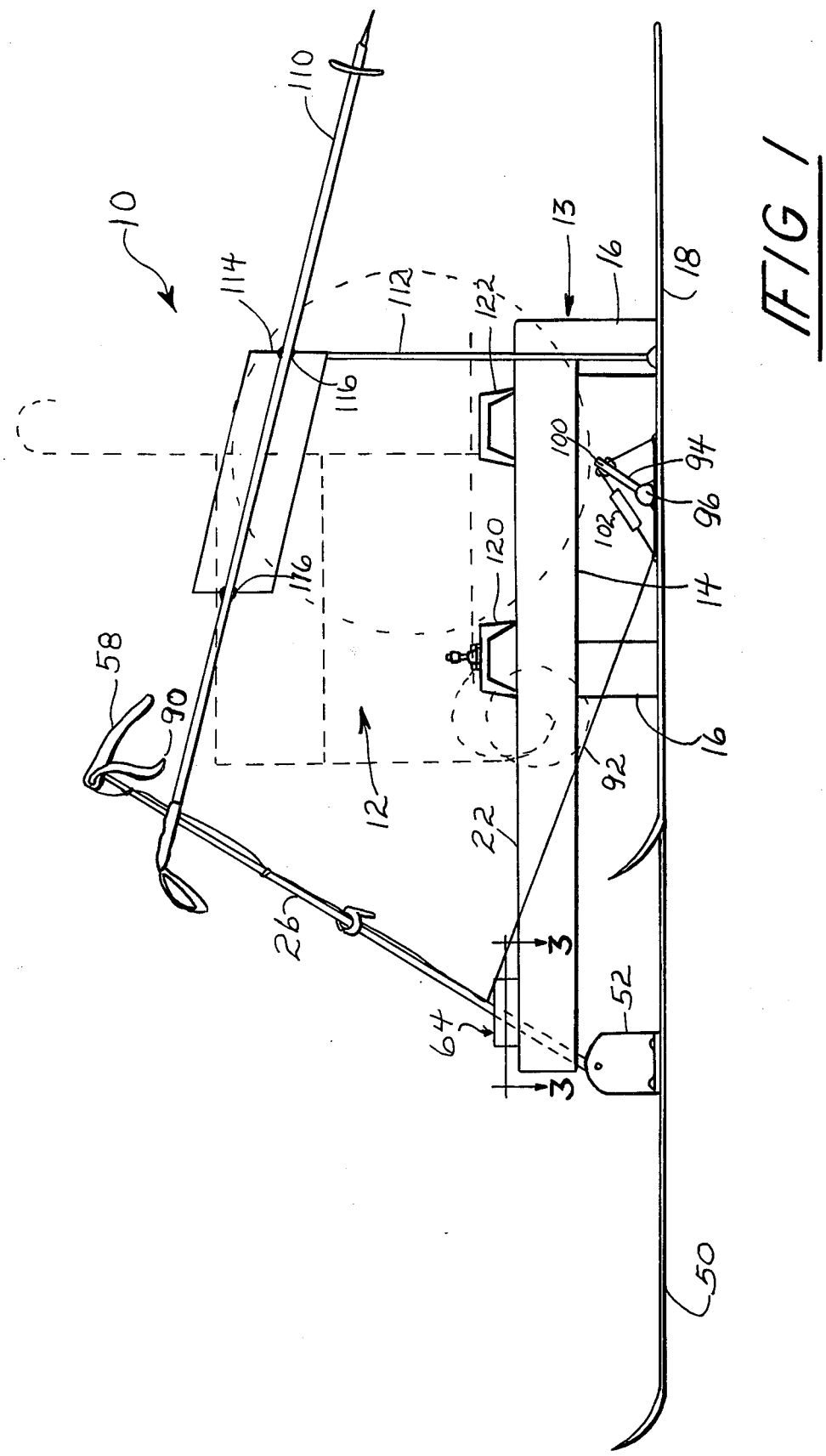
FIG. 1 is a side elevational view of a sled constructed in accordance with the principles of the present invention illustrating a wheelchair in phantom lines and lateral outriggers removed for clarity.
Figure 5:
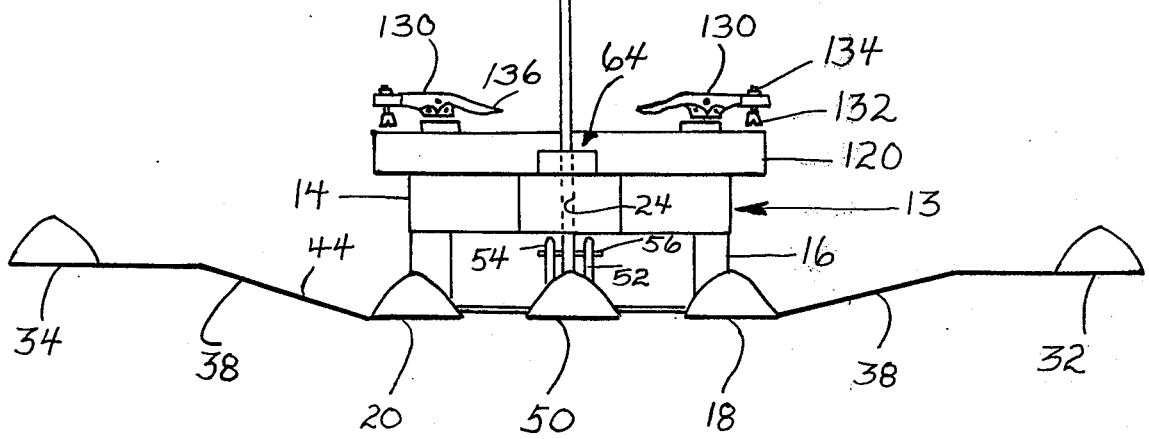
FIG. 5 is a front plan view of the sled illustrated in FIGS. 1 and 2 of the drawings.

Referring now to the drawings and, in particular, to FIGS. 1, 2 and 5 wherein there is illustrated one example of the present invention in the form of a sled 10 adapted to carry a conventional wheelchair 12 such that the occupant (not shown) of the wheelchair 12 may steer the sled 10 while the sled travels downhill in a controlled and safe manner.

The sled 10 comprises a frame portion 13 consisting of a plurality of U-shaped channel members 14 which are secured to each other to form a rectangular portion at the midsection of the sled. The channel members 14 are supported in a horizontal position by means of upstanding struts 16 which function to fixedly attach the channel members 14 to a pair of laterally spaced ski runners 18 and 20. The channel members 14 define a triangularly shaped portion 22, the forward end of which is apertured at 24 to slidably receive the lower portion of a steering post 26, all of which will be described in greater detail hereinafter. The structural members 14 forming the frame 13, as well as the struts 16 and the runners 18, are preferably fabricated from a light-weight material, such as aluminum, or a suitable plastic material, such as polyurethane, which has sufficient strength and durability to support the wheelchair 12 in a safe manner. The frame 13 is approximately 40 inches long, and the runners 18 and 20 are 40 inches long. As can best be seen in FIG. 2, the rearward portion of the ski runners 18 and 20 extend rearwardly of the frame 13 a sufficient distance of approximately 12 inches whereby the upper surfaces 30 of the ski runners 18 and 20 define a support surface to permit a person to stand thereon and to manipulate the sled 10 in the event the occupant of the wheelchair is unable to do so.

As can best be seen in FIGS. 2 and 5 of the drawings, the sled 10 has a pair of outriggers 32 and 34 which are respectively connected to the ski runners 18 and 20. Each of the outriggers 32 and 34 comprises a ski runner 36 which is similar in shape, construction and size to the runners 18 and 20. The ski runners 36 are attached to the ski runners 18 and 20 by means of laterally disposed connecting members 38 which are disposed at strategic locations along the length of the runners 18 and 20 and are secured to the runners by any suitable means, such as threaded fasteners, that extend through the connecting members 38 and into the respective runners. As can best be seen in FIG. 5 of the drawings, the runners have a slight incline 44 which elevates the outriggers 32 and 34 above the runners 18 and 20 such that, during normal use of the sled 10, the outriggers 32 and 34 do not engage in the snow and do not cause unnecessary slowing of the sled 10. However, it becomes obvious that if the sled 10 should tilt to the left or the right to an excessive amount, the runners 36 will engage the ground and prevent the undesirable and possibly dangerous rolling over of the sled 10.

The sled 10 further comprises a steering runner 50 which has a pair of L-shaped flange members 52 and 54 which mount a coupling pin 56 which, in turn, extends through an aperture in the bottom of the steering post 26 whereby the steering post 26 may be pivotally coupled to the steering runner 50. This pivotal connection is necessary to permit the ski 50 to be turned to the left and right to facilitate steering of the sled 10 without damage to the coupling. The steering post 26 extends upwardly through the inclined aperture 24 in the forward end of the frame 13 for attachment to a steering wheel 58. As can best be seen in FIG. 1, the steering post 26 is of a sufficient length (33 inches in the instant embodiment) such that the steering wheel 58 is positioned in close proximity to the occupant of the wheelchair 12 such that the occupant, while comfortably seated in the wheelchair 12, may conveniently grasp the steering wheel 58 so as to steer the steering ski runner 50 and thereby control the direction of movement of the sled 10. As can best been seen in FIGS. 2 and 3 of the drawings, the right-hand portion of the steering wheel 58 includes a hand-operated lever 60 which is coupled through suitable cabling 62 to a steering wheel locking mechanism 64. The mechanism 64 is disposed within a housing 68 which normally conceals the same and protects it from the elements.

As can best be seen in FIG. 3, the steering post 26 is provided with a square-shaped collar 66 which is adapted to be selectively engaged by rubber clamps 68 and 70. It can be seen that when the sled steering runner 50 is in a forward position such that the sled will travel in a straight line, the sides 72 and 74 of the square collar are aligned with the rubber clamps 68 and 70 such that, when the lever 60 is actuated, the cable 62 will be operative to bring the rubber clamps 68 and 70 into engagement with the square edges 72 and 74 and thereby lock the sled steering runner 50 in the position illustrated. It can thus be seen that as long as the lever 60 is held in the depressed position, the sled will continue to move along the selected straight-line path. The rubber clamps 68 and 70 are respectively attached to pivot members 76 and 78 which are both pivotally attached by means of pivot pin 80 to the frame 13. The pivot members 76 and 78 each have arm members respectively numbered 77 and 79 through which the cable 62 extends. The cable 62 is fixedly attached to the lever arm 77. It can be seen that as the lever arm 60 is depressed by the occupant, the cable 62 will force the lever arm 77 towards the lever arm 79, thereby compressing the rubber clamps 68 and 70 into engagement with the square edges 72 and 74 of the steering post 26 and locking the same in the desired position. It should be noted that other mechanisms may be utilized to provide for the multiple locking of the steering post 26 and, thus, the direction of the ski runner 50 into any one of a plurality of positions. It is envisioned by the applicant that only one such position is necessary. This position would permit the occupant of the sled 10 to manipulate the sled onto a towline run locking the runner 50 in a forward position in the aforementioned manner and then grabbing the towline with both hands whereupon the sled 10, along with the occupant, would be carried up the hill in the conventional manner. The lever 60 and the associated locking mechanism 64 permit the occupant to use two hands to grasp the towline. The lever 60 may be maintained in a lock position by means of a strap 81 which will engage the lever 60 and maintain the same in the depressed position. Obviously, other mechanism devices may be employed to accomplish the same desired result of locking the steering ski runner 50 in a desired position.

Figure 4:
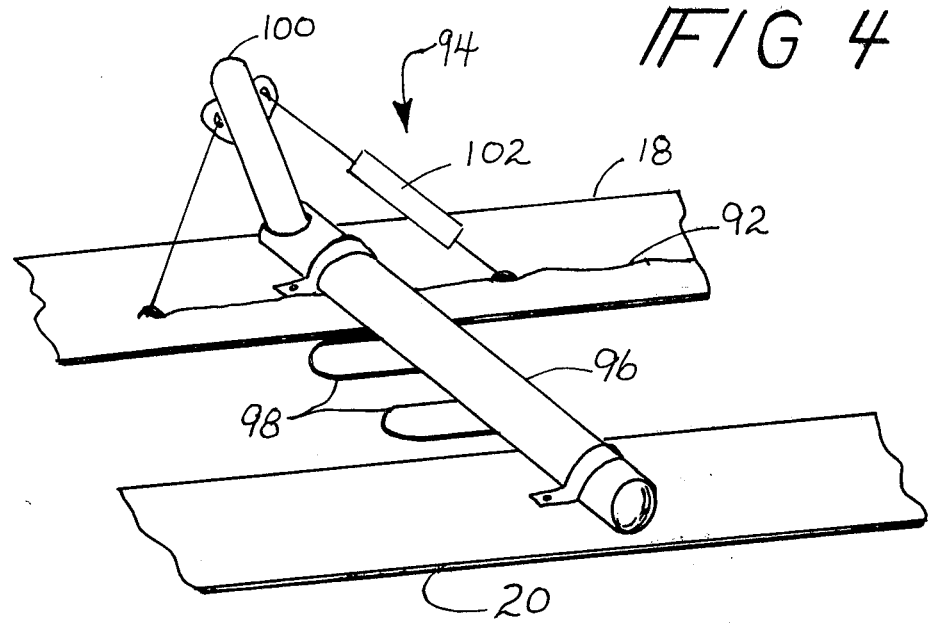
FIG. 4 is a fragmentary perspective view of the braking mechanism incorporated in the sled illustrated in FIGS. 1 and 2 of the drawings.

As can best be seen in FIGS. 2, 4 and 5, the opposite side of the steering wheel 58 is provided with a second lever 90. The lever 90 is a braking lever connected by a suitable cable 92 to a braking mechanism 94. The braking mechanism 94 comprises a transverse shaft 96 that includes a plurality of members 98 which are adapted to engage the snow and thereby slow down the sled 10 and bring the same to a stop when the brake 94 is actuated. This is accomplished by rotating the shaft 96 counterclockwise (as viewed in FIG. 4) such that the members 98 are driven into the snow and cause the aforementioned stopping of the sled 10. Rotation of the shaft 96 may be obtained by connecting the braking cables 92 to a lever 100 that extends from one end of the shaft 96. It can thus be seen that as the braking lever 90 is depressed and the cable 92 is drawn inwardly, the lever arm 100 is pulled downwardly toward the ski 18, and the shaft 96 is rotated in the counterclockwise direction. When the braking lever 90 is released and the tension in the cable 92 is relieved, a spring mechanism 102 acting on the lever arm 100 will draw the same back to its original position, thereby rotating the braking shaft 96 in a clockwise direction, raising the braking members 98 from engagement with the snow, and releasing the brake 94.

As can best be seen in FIG. 1 of the drawings, the sled 10 is provided with a pair of ski poles 110. The ski poles 110 permit the user to grasp the same and push the sled along when the same is on level ground so that the occupant of the sled may traverse level ground and bring the sled to the desired location, such as the towrope. Thus, the occupant may be independent of another's aid and may continue to slide down the hill and proceed to the towrope, as desired. In order to facilitate the convenient use of the skis 110, the sled 10 is provided with a ski poles' support in the form of an upright member 112 which is attached by suitable means to the sled, such as fasteners and the like, extending through the upright support and into the sled support frame 16. The upper end of the support 112 carries a flange 114 that is provided with a pair of U-shaped rubber clips 116 onto which the ski poles 110 may be easily and simply engaged and supported when not in use. When the occupant of the wheelchair 12 desires to use the ski poles 110, he simply grasps the same and snaps them from their U-shaped clips 116.

The upper portion of the sled frame 13 mounts a pair of longitudinally spaced and laterally disposed support members 120 and 122. As can best be seen in FIG. 5 of the drawings, these support members overhang the frame by a few inches. The transverse length of the support members is such as to permit the support members to be disposed between the wheels of a conventional wheelchair such that the wheels overhang the support members, but the frame of the conventional wheelchair will be resting upon the upper surface of the support member and be supported thereby. The upper surface of the support members is spaced a sufficient distance from the upper surface of the ski runners 18 and 20 such that the wheelchair's wheels will not interfer with the runners or their smooth operation. As can best be seen in FIG. 5 of the drawings, the upper surface of each of the support members is provided with a pair of toggle locking mechanisms 130. The locking mechanisms 130 are provided with a V-shaped clamping member 132 which has a threaded element that extends up through the elongated slot in the toggle locking mechanism 130 and engages a threaded nut 134. This facilitates the lateral movement of the V-shaped clamping member 132 back and forth to permit for several inches of lateral adjustment so that wheelchair frames of varying sizes may be accommodated by the frame 13 and attached thereto. It can be seen that the toggle mechanism includes a handle 136 which permits it to be raised and lowered to engage the wheelchair frame and securely lock the wheelchair frame to the sled. It is obvious that the locking mechanisms 130 are disclosed as examples and that many forms of locking mechanisms may be employed to securely attach a wheelchair 12 to the sled 10 in a manner which permits the wheelchair 12 to be easily and simply attached to and removed from the sled 10 and releasably locked thereto in a convenient and safe manner.

It can thus be seen that the present invention provides a new and improved sled particularly adapted to mount a wheelchair thereto to permit a wheelchair occupant to ride the sled downhill in a safe and convenient manner. It can also be seen that the sled is provided with several safety features including the brake mechanism and the steering post lock mechanism to facilitate the use of the sled on towropes and the like. It can also be seen that the sled runners 18 and 20 extend behind the frame 13 a sufficient distance to permit a second person to straddle the frame and ride downhill on the sled along with the wheelchair occupant so that the second person can assume control of the sled in the event the wheelchair occupant is unable to do so.

It should be understood by those skilled in the art of sleds that other forms of applicant's invention may be had, all coming within the spirit of the invention and scope of the appended claims.

What is claimed is as follows:

1. A sled for the releasable attachment of a wheelchair, said sled comprising:

a pair of longitudinally spaced, horizontally disposed support members;

a pair of ski runners;

frame means consisting of a plurality of transverse channel members secured to said support members forming a rectangular portion at the midsection of said sled, said ski runners being fixedly attached to said support members such that the upper surfaces of said support members are elevated above said ski runners, said support members being spaced apart and of such a length as to be received laterally between the wheels of a conventional wheelchair so as to support said wheelchair on said sled and said wheelchair wheels being elevated above said ski runners;

securing means carried by the upper surface of said support member for lockingly engaging said wheelchair frame to secure said wheelchair to said sled;

a steering runner;

a steering post pivotally connected by said frame means for attaching said steering runner to said sled, said steering post having a steering wheel, said post extending above said frame means a sufficient distance to permit the occupant of said wheelchair to manipulate and steer said sled;

a pair of outriggers extending laterally from said ski runners for providing lateral flexible support to said sled for preventing said sled from tilting sideways beyond a predetermined amount, said flexible support comprising a multiplicity of flexible lateral planer members affixed at one end to said support members and at the other end to said outriggers; and a wheelchair fixedly and detachably attached to said support members.

2. The sled defined in claim 1 wherein said ski runners extend rearwardly of said frame means a sufficient distance to support a second person's standing on said rearward portions of said ski runners.

3. The sled defined in claim 1 further comprising brake means carried by said ski runners for engaging snow for slowing and stopping said sled.

4. The sled defined in claim 1 further comprising means associated with said steering shaft for locking said steering shaft in a predetermined position whereby the sled direction may be controlled without the occupant manipulating the steering wheel.

* * * * *